United States Patent [19]
Kholodny et al.

[11] Patent Number: 6,156,269
[45] Date of Patent: Dec. 5, 2000

[54] METHOD OF PROTECTING HIGH-ENERGY MACHINERY FROM CORROSION DAMAGE

[75] Inventors: Vladimir Ivanovich Kholodny; Nikolai Sergeevich Goncharov; Nikolai Konstantinovich Meshkov; Vladimir Sergeevich Rachuk, all of Voronezh, Russian Federation; Vladimir Ivanovich Tkachev, Lvov, Ukraine; Alexandr Viktorovich Shostak, Voronezh, Russian Federation

[73] Assignee: Konstrutorskoe Bjuro Khimavtomatiki, Voroshilova, Russian Federation

[21] Appl. No.: 09/125,755

[22] PCT Filed: Mar. 14, 1997

[86] PCT No.: PCT/RU97/00067

§ 371 Date: Aug. 25, 1998

§ 102(e) Date: Aug. 25, 1998

[87] PCT Pub. No.: WO97/35048

PCT Pub. Date: Sep. 25, 1997

[30] Foreign Application Priority Data

Mar. 19, 1996 [RU] Russian Federation ............. 96105183

[51] Int. Cl.$^7$ ........................................................ C23F 11/02
[52] U.S. Cl. ..................................................... 422/9; 422/10
[58] Field of Search ............................................ 422/9, 10

[56] References Cited

U.S. PATENT DOCUMENTS 3,628,912  12/1971  Oertle et al. ................................ 422/9

FOREIGN PATENT DOCUMENTS

| 0 086 439 | 8/1983 | European Pat. Off. . |
| 2.229.861 | 12/1974 | France . |
| 62-182290 | 8/1987 | Japan . |
| 4-203465 | 7/1992 | Japan . |
| 628324 | 10/1978 | U.S.S.R. . |
| 1002633 | 3/1983 | U.S.S.R. . |

*Primary Examiner*—Elizabeth McKane
*Attorney, Agent, or Firm*—Nath & Associates PLLC; Gary M. Nath; Harold L. Novick

[57] ABSTRACT

The invention relates to the field of power engineering.

The method for protecting power plants, in which hydrogen is used as the working fluid, against destruction is carried out by reducing the diffusion of hydrogen into the structural metal material of the power plant, wherefore active gaseous additives capable of preventing adsorption on a metal surface are introduced into gaseous hydrogen in an amount of from $10^{-4}\%$ by volume to the permissible critical content of the additives in hydrogen. The gaseous additives are selected from the group including F, Cl, O and S and their compounds.

7 Claims, No Drawings

METHOD OF PROTECTING HIGH-ENERGY MACHINERY FROM CORROSION DAMAGE

FIELD OF THE INVENTION

The invention relates to the field of power engineering and more exactly relates to a method for protecting power plants, in which hydrogen is used as the working fluid, against destruction.

BACKGROUND ART

There is a problem which exists during the development of power plants in which hydrogen is used as the working fluid, this problem being that hydrogen to one or another degree interacts with almost all of the structural metal materials, diffusing inside them and making them brittle, which may result in catastrophic destruction of the plants.

At present, structural materials which are less sensitive to hydrogen, for example, high-alloy steels and alloys on a nickel base with the structure of a stable austenite, are used in order to protect power plants from the destructive action of hydrogen. The aforesaid materials are very expensive and are not technological to a sufficient degree, which limits the possibility for their utilization.

A method is known for protecting power plants against the destructive action of hydrogen by changing the construction and technology of the process. However, realization of this method requires the input of large material expenditures and results in reduction of the efficiency.

The most promising method is the method for protecting power plants, in which hydrogen is used as the working fluid, against destruction by reducing the diffusion of hydrogen into the structural metal material of the plant (Ju.I. Archakov "Hydrogen Corrosion of Steel," Moscow, Metallurgiya, 1985, p. 161). In the known method, in order to reduce diffusion of hydrogen into the metal, a protective layer is created on the surface of the metal—elements of the construction are plated or lined with metals having a lower hydrogen permeability or barrier layers are created on the surface of the metal which prevent diffusion of hydrogen into the metal. For example, oxide films, carbide and nitride coatings, or protective layers of other metals are applied (copper plating, silver plating, gold plating, etc. are effected).

The barrier coatings are applied by galvanic, ionoplasma, thermal diffusion, etc., methods, which, since they are labor-consuming and complex in technological execution, are not an effective protection, but only weaken and slow down the process of hydrogenation, wherein, in the majority of cases it is not possible to protect the inner cavities of the power plants or joints of the assembly elements, or to completely eliminate characteristic production defects (cuts, incomplete fusions, scaling of coatings, etc.) which are sources of destruction.

DISCLOSURE OF THE INVENTION

The object of the invention is to develop a method for protecting power plants, in which hydrogen is used as the working fluid, against destruction, which method would ensure reliable protection of metal surfaces of the mains through which the working fluid is supplied, the mains being of any relatively complex configuration, and which would be sufficiently simple to realize.

This object is achieved in a method for protecting power plants, in which hydrogen is used as the working fluid, against destruction by reducing diffusion of hydrogen into structural metal material of the power plant, in that in accordance with the invention, reduction of diffusion is ensured by introducing active gaseous additives, which are capable of preventing adsorption on a metal surface, into gaseous hydrogen in an amount of from $10^{-4}\%$ by volume to the permissible critical content of the additives in hydrogen, wherein the gaseous additives are selected from the group including F, Cl, O, S and their compounds.

It is advisable that the gaseous additives be introduced using a dosing apparatus.

It is preferable that CO or $O_2$ be introduced into hydrogen as the additive.

In order to uniformly distribute the additive throughout the whole volume of hydrogen, it is preferable to introduce the additive into hydrogen while maintaining the temperature at a temperature exceeding the boiling point of the additive.

BEST METHOD OF CARRYING OUT THE INVENTION

The presence of gaseous additives with specific unsaturated bonds of molecules ($F_2$, $Cl_2$, $O_2$, CO, $SO_2$ and other compounds of elements F, Cl, O, S) in the working fluid—high pressure gaseous hydrogen, of a power plant, due to their capability of preventing adsorption changes the character of interaction of the surface metal-hydrogen system and under conditions of competitive adsorption of different elements hinders chemisorption and the penetration of hydrogen into the metal and embrittlement of the latter.

As a result of catalytic action of the surface of the metal in the hydrogen-metal system, adsorption of hydrogen molecules with subsequent penetration of hydrogen atoms into the metal only occurs in the centers of chemisorption with its subsequent coalescence in spots where the crystal lattice is not perfect and there is embrittlement. Dissociation of different gases may occur at the centers of chemisorption, wherein the ease and sequence of dissociation of gases from the mixture upon contact with the surface of the metal will be determined by the molecular forces of the bonds in the gases, and the capability of reacting with the centers of chemisorption—by the amount and activity of uncompensated spin bonds. If there are corrosion-active gases (additives) having a dissociation energy comparable with the dissociation energy of hydrogen molecules and with uncompensated spin moments (in halogens—chlorine and fluorine there is one P-electron, in oxygen and sulfur-containing gases—two P-electrons) in gaseous hydrogen, then competitive adsorption and interaction ("contamination") with the centers of chemisorption take place, which prevents the penetration of hydrogen into the metal from the gaseous medium and embrittlement of the metal.

The amount of introduced inhibiting additives depends on their nature, the temperature and pressure of the working fluid—hydrogen, the structural features of the plant being protected. The lower limit of the content of additives is limited by the number of centers of chemisorption on the surface of the metal and corresponds to $\sim 10^{-4}\%$ by volume, the upper limit by the permissible critical content in hydrogen which does not bring about combustion or impairment of the service characteristics of the working fluid. Supply of the inhibiting additives into the working fluid—hydrogen, is effected by means of a device—a dosing apparatus, additionally provided in the penumohydraulic system of the power plant.

Due to the fact that the inhibiting additives are introduced into hydrogen at a temperature exceeding the boiling point of the additives, the latter, uniformly spreading throughout the volume of the working fluid—gaseous hydrogen, ensure a protective effect in the most hard to reach places in the construction of the power plant.

An example of a concrete embodiment of the method for protecting in accordance with the invention is presented below to provide better understanding of the essence of the present invention.

EXAMPLE

Oxygen in an amount of 0.3% by volume was fed into gaseous hydrogen which was at a pressure of 30 MPa. Samples of structural materials were placed in this mixture and the criteria B of serviceability of this material were evaluated as the ratio of a mechanical characteristic of the material, obtained during tests in hydrogen, to this same characteristic during tests in air.

In respect of chrome-nickel-molybdenum austenite-martensite steel strongly embrittled by hydrogen at room temperature, the criteria B of serviceability during tests in hydrogen with the addition of 0.3% by volume of oxygen were:

$B_\delta=1.04$; $B_\psi=1.02$; $B_{\delta'}=0.77$; $B_{\psi'}=0.60$, wherein $\delta$ is the provisional tensile strength (ultimate strength), $\psi$ is the relative narrowing of the cross sectional area of the sample, $\delta'$, $\psi'$ are the same characteristics for samples with a sharp annular cut.

For comparison, tests of similar samples of chrome-nickel-molybdenum austenite-martensite steel were carried out in a medium of pure oxygen (without additives) at a pressure of 30 MPa. The following criteria of serviceability were obtained:

$B_\delta=0.85$; $B_\psi=0.25$; $B_{\delta'}=0.58$; $B_{\psi'}=0.30$.

Such an inhibiting effect of additives of oxygen and carbon oxide was also confirmed in respect of maraging steel and nickel alloy at different temperatures. The permissible explosion-proof content of oxygen in the hydrogen-oxygen mixture under normal conditions is 6% by volume, while the inhibiting effect of oxygen during tests in a non-flow-through chamber reached saturation at 5% by volume of oxygen.

The proposed method for protecting elements of the construction of power plants against embrittlement by gaseous hydrogen makes it possible to enhance the service life and reliability of operation of power plants, reduce labor-consuming technology, materials consumption and cost of equipment, eliminate destruction of aggregates due to undetected manufacturing defects, and in some cases to use the new ecologically clean fuel—hydrogen, in existing types of power plants without substantially remaking the equipment and reorganizing the operation.

INDUSTRIAL APPLICABILITY

The method for protecting power plants, in which hydrogen is used as the working fluid, against destruction can be successfully used in internal combustion engines, turbomachines, rocket and jet engines and other apparatuses operating on hydrogen.

Preferably, the method in accordance with the invention should be used in jet and rocket engines.

What is claimed is:

1. A method for protecting power plants, in which hydrogen is used as the working fluid, against destruction by reducing diffusion of hydrogen into structural metal material of a power plant, characterized in that reduction of diffusion is ensured by introducing active gaseous additives, which are capable of preventing adsorption on a metal surface, into gaseous hydrogen in an amount of from $10^{-4}$ percent by volume to the permissible critical content of the additives in hydrogen, wherein the gaseous additives are selected from the group including F, Cl, O, S and their compounds.

2. A method according to claim 1, characterized in that the gaseous additives are introduced using a dosing apparatus.

3. A method according to claim 2, characterized in that $O_2$ is introduced into the hydrogen.

4. A method according to claim 1, characterized in that $O_2$ is introduced into the hydrogen.

5. A method for protecting power plants, in which hydrogen is used as the working fluid, against destruction by reducing diffusion of hydrogen into structural metal material of a power plant, characterized in that reduction of diffusion is ensured by introducing active gaseous additives, which are capable of preventing adsorption on a metal surface, into gaseous hydrogen in an amount of from $10^{-4}$ percent by volume to the permissible critical content of the additives in hydrogen, wherein the gaseous additives are selected from the group including F, Cl, O, S and their compounds wherein CO is introduced into the hydrogen.

6. A method according to claim 1, characterized in that the additives are introduced into hydrogen while maintaining the temperature at a temperature exceeding the boiling point of the additives.

7. A method for protecting power plants, in which hydrogen is used as the working fluid, against destruction by reducing diffusion of hydrogen into structural metal material of a power plant, characterized in that reduction of diffusion is ensured by introducing active gaseous additives, which are capable of preventing adsorption on a metal surface, into gaseous hydrogen in an amount of from $10^{-4}$ percent by volume to the permissible critical content of the additives in hydrogen, wherein the gaseous additives are selected from the group including F, Cl, O, S and their compounds;

wherein the gaseous additives are introduced using a dosing apparatus; and wherein CO is introduced into the hydrogen.

* * * * *